United States Patent
Edlinger

(10) Patent No.: US 6,676,747 B2
(45) Date of Patent: Jan. 13, 2004

(54) METHOD FOR PRODUCING PUZZOLANIC BINDERS FOR THE CEMENT INDUSTRY FROM STEEL SLAGS USING A REDUCTION METAL BATH

(75) Inventor: Alfred Edlinger, Bartholomäberg (AT)

(73) Assignee: Holcim Ltd., Jona (CH)

( * ) Notice: Subject to any disclaimer, the term of this patent is extended or adjusted under 35 U.S.C. 154(b) by 0 days.

(21) Appl. No.: 10/182,046

(22) PCT Filed: Jan. 18, 2001

(86) PCT No.: PCT/AT01/00013

§ 371 (c)(1), (2), (4) Date: Oct. 28, 2002

(87) PCT Pub. No.: WO01/55457

PCT Pub. Date: Aug. 2, 2001

(65) Prior Publication Data

US 2003/0084821 A1 May 8, 2003

(30) Foreign Application Priority Data

Jan. 28, 2000 (AT) .......................................... 62/2000 U

(51) Int. Cl.$^7$ .............................. C04B 5/06; C21B 3/06; C21C 5/36; C22B 7/04

(52) U.S. Cl. ........................................ 106/789; 106/791

(58) Field of Search .................................. 106/789, 791

(56) References Cited

U.S. PATENT DOCUMENTS

| | | | | |
|---|---|---|---|---|
| 4,793,933 A | * | 12/1988 | Rostoker et al. ............. | 210/710 |
| 5,882,375 A | * | 3/1999 | Edlinger et al. ............ | 75/10.35 |
| 6,139,621 A | * | 10/2000 | Edlinger ...................... | 106/715 |
| 6,196,479 B1 | * | 3/2001 | Edlinger ......................... | 241/1 |
| 6,241,797 B1 | * | 6/2001 | Edlinger ..................... | 75/10.14 |
| 6,395,054 B1 | * | 5/2002 | Edlinger ...................... | 75/434 |

FOREIGN PATENT DOCUMENTS

| | | | |
|---|---|---|---|
| GB | 1412486 | * | 11/1975 |
| JP | 2-22154 | * | 1/1990 |
| WO | WO 98/45218 | | 10/1998 |

* cited by examiner

*Primary Examiner*—Anthony J. Green
(74) *Attorney, Agent, or Firm*—Chapman and Cutler LLP

(57) ABSTRACT

In a method for producing puzzolanic or hydraulic grinding additives for the cement industry from basic oxidic slags, in particular steel slags, using a metal bath for the reduction of metal oxides contained in the slags, the basicities of the liquid slags are adjusted to values lying 0.1 to 0.5 below the basicity value ($CaO/SiO_2$) of the target slag prior to the reduction by adding acidic corrective substances such as, e.g., quartz sand and/or blast furnace slag and/or $SiO_2$-containing corrective substances.

20 Claims, No Drawings

METHOD FOR PRODUCING PUZZOLANIC BINDERS FOR THE CEMENT INDUSTRY FROM STEEL SLAGS USING A REDUCTION METAL BATH

The invention relates to a method for producing puzzolanic or hydraulic grinding additives for the cement industry from basic oxidic slags.

From EP 666 930 B1, a method has already been known, in which steel slags are reduced using pig iron and, in particular, the carbon content. present in the pig iron, thus causing, on the one hand, the pig iron bath to be refined and, at the same time, the iron oxide from the steel slag to be reduced to iron and get into the metal bath. Oxidic slags and, in particular steelworks slags, depending on their metal oxide contents and their basicities, have a more or less high viscosity, thus calling for an operation at comparatively high temperatures in order to maintain an accordingly highly liquid slag. If such slags are, moreover, adapted in view of cement-technologically interesting compositions by suitable corrective substances, this will frequently result in slags tending to intensified foaming at usual temperatures on account of the intense CO formation from the carbon of the bath. If foams occurring in that manner are stable, this will give rise to a reduced mass transfer between metal and slag and hence a clearly lowered reduction rate, thus substantially extending the treatment time. If, at the same time, it is operated with a relatively high carbon content of the metal bath, this may provoke particularly vigorous reactions in the interface, which may cause heavy foaming and even undesired slag spittings.

The invention aims to lower the initial reaction rate and shorten the treatment time in the processing of such basic oxidic slags while, at the same time, ensuring the safe and rapid reaction and, in particular, reduction of metal oxides in the slag at a low temperature level. To solve this object, the method according to the invention essentially consists in that the basicities of the liquid slags are adjusted to values lying 0.1 to 0.5 below the basicity value ($CaO/SiO_2$) of the target slag prior to said reduction by adding acidic additives such as, e.g., quartz sand and/or blast furnace slag and/or $SiO_2$-containing corrective substances. By lowering the basicities of the liquid slags to relatively low values and, in particular, lower values than appear desirable for the subsequent utilization in cement technology, a slag that is highly liquid even at lower temperatures and exhibits only a slight tendency to foaming can be immediately obtained. The decrease of the basicity and the thus connected lowering of the viscosity as a function of the temperature level lead to a clearly higher reduction rate and hence a more rapid reaction during which, in particular, iron and manganese oxides are rapidly reduced to metallic iron and metallic manganese, respectively. Likewise, oxides of chromium, nickel, vanadium and other metals are reduced. With the metal oxide content decreasing, also the conversion of the carbon contained in the bath to carbon monoxide and carbon dioxide naturally goes down, thus substantially reducing the risk of slag foaming. If appropriate amounts of $Al_2O_3$ are added, the viscosity is additionally lowered, and a smaller decrease of the basicity will do in order to obtain the desired reaction rate.

Within the context of the method according to the invention, it is subsequently proceeded in an advantageous manner in that the basicities of the slags at the end, or near the end, of the reduction phase are adjusted to the desired target basicity of between 1.1. and 1.5. On account of the diminished carbon conversion and the thus declined tendency to foaming, it is, therefore, feasible to adjust the target basicity sought for cement-technological reasons already towards the end of the reduction, it being feasible to effect the respective addition in the converter in which the reduction of the steel slags was performed.

In order to adjust a preferred cement-technological composition of the slags, also an increase in the $Al_2O_3$ content is usually desirable in addition to the adjustment of a target basicity to values of between 1.1. and 1.5, wherein bauxite may, for instance, be added for that purpose. In order to ensure a rapid conversion in the reduction phase, it will be of advantage if also the $Al_2O_3$-containing corrective substances are added already at the beginning of treatment, it being advantageously proceeded such that $Al_2O_3$-containing corrective substances such as, e.g., bauxite at least partially are added prior to the reduction of the slags. By adding a partial amount of the additives required for the adjustment of the $Al_2O_3$-content prior to reduction, reliable blending within the slag at a simultaneous decrease of the slag viscosity is safeguarded during the reduction procedure, said partial amount preferably ranging between one half and three quarters of the required addition of $Al_2O_3$-containing additives.

In a particularly simple manner, the target basicity may be adjusted by adding burnt lime and/or CaO-containing corrective substances.

The lowering of the basicity to values near the neutral point prior to reduction also brings about particular advantages in respect to the service life of a nonbasic refractory lining.

Within the context of the method according to the invention, it is advantageously proceeded such that the target basicity is approached from a point of time at which the metal oxide content and, in particular, the sum of the iron oxide, manganese oxide, chromium oxide, nickel oxide and vanadium oxide contents of the slag falls below 3.5 wt.-%. From a decrease of the metal oxide content to values of below 3.5 wt.-%, foaming is already. largely avoided because of the substantially diminished conversion of the carbon contained in the bath as pointed out above, so that it is already from that point of time that the additives required for approaching the target basicity and the cement-technological composition may be added without adversely affecting the method.

In the following, the invention will be explained in more detail by way of an exemplary embodiment.

EXAMPLE 1

In a converter, 3 tons of a slag having the composition indicated below were charged onto 10 tons of pig iron:

| Slag | |
|---|---|
| | wt. % |
| CaO | 45.1 |
| $SiO_2$ | 15.6 |
| $Al_2O_3$ | 3.3 |
| MgO | 6.7 |
| $TiO_2$ | 1.1 |
| FeO | 25.7 |
| MnO | 2.5 |
| $CaO/SiO_2$ | 2.9 |

During the reduction procedure, carbon was supplied to the metal bath in the form of carbon carriers. By feeding coal and oxygen, the temperature required for maintaining a liquid slag was safeguarded and the necessary reduction potential was provided. The slag basicity was lowered to a value of 1.1 by blowing in 770 kg quartz sand, and 494 kg bauxite were added, whereby a slag having the following composition was formed at the beginning of the melt reduction:

Slag composition prior to melt reduction

|  | wt. % |
|---|---|
| CaO | 35.5 |
| $SiO_2$ | 32.2 |
| $Al_2O_3$ | 9.4 |
| MgO | 5.5 |
| $TiO_2$ | 0.4 |
| FeO | 15.4 |
| MnO | 1.6 |
| $CaO/SiO_2$ | 1.1 |

Towards the end of the reduction phase in which, in particular, the FeO content could be lowered from 15.4 wt.-% to values of below 1% and the manganese oxide content could be substantially halved, the final slag composition sought was adjusted by the addition of 265 kg burnt lime and 330 kg bauxite. The altogether relatively low metal oxide content of about 1.7 wt.-% and the slight conversion of the carbon contained in the bath to carbon monoxide and carbon dioxide towards the end of the reduction phase prevents foaming at that point of time till the end of treatment. The following composition of the target slag, which stood out for its excellent cement-technological properties, could be reached:

Slag composition after melt reduction

|  | wt. % |
|---|---|
| CaO | 44.7 |
| $SiO_2$ | 34.5 |
| $Al_2O_3$ | 14.5 |
| MgO | 4.3 |
| $TiO_2$ | 0.3 |
| FeO | 0.8 |
| MnO | 0.9 |
| $CaO/SiO_2$ | 1.3 |

Within the context of this method, the slag basicity was, thus, reduced to below the value of the target basicity by a total of 0.2, whereby foaming and undesired slag spitting could be safely prevented.

EXAMPLE 2

In a converter, 4 tons of a slag having the composition indicated below were charged in the liquid state onto 10 tons of pig iron:

Slag

|  | wt. % |
|---|---|
| CaO | 47.8 |
| $SiO_2$ | 26.3 |
| $Al_2O_3$ | 5.9 |
| MgO | 8.9 |
| $TiO_2$ | 1.3 |

-continued

Slag

|  | wt. % |
|---|---|
| FeO | 1.7 |
| MnO | 1.4 |
| $Cr_2O_3$ | 6.7 |
| $CaO/SiO_2$ | 1.8 |

The above-mentioned slag was subjected to a melt reduction process by feeding coal and oxygen.

Yet, prior to that, the chemistry of the slag was changed in a manner that its viscosity decreased. This was effected by the addition of 867 kg quartz sand and 980 kg bauxite.

At the same time, a reduction reaction set in already by the metal-oxide-containing slag contacting the carbon-containing iron bath.

Both effects (the adjustment of the basicity and $Al_2O_3$ content as well as the commencing reduction) resulted in the following composition prior to the onset of the melt reduction treatment proper:

Slag composition prior to melt reduction

|  | wt. % |
|---|---|
| CaO | 35.6 |
| $SiO_2$ | 35.8 |
| $Al_2O_3$ | 14.1 |
| MgO | 6.7 |
| $TiO_2$ | 1.4 |
| FeO | 1.3 |
| MnO | 1.0 |
| $Cr_2O_3$ | 4.1 |
| $CaO/SiO_2$ | 1.0 |

After the end of the reduction phase, the final slag composition sought was adjusted by the addition of 828 kg burnt lime and 237 kg bauxite.

The composition of the final slag was determined as follows:

Slag composition after melt reduction

|  | wt. % |
|---|---|
| CaO | 45.0 |
| $SiO_2$ | 31.4 |
| $Al_2O_3$ | 14.4 |
| MgO | 5.9 |
| $TiO_2$ | 1.3 |
| FeO | 1.1 |
| MnO | 0.8 |
| $Cr_2O_3$ | 0.03 |
| $CaO/SiO_2$ | 1.4 |

What is claimed is:
1. A method for producing additives for the cement industry from basic oxidic slags, comprising the steps of
   charging liquid slags onto a metal bath;
   adding at least one acidic substance to said liquid slags to adjust the basicity of said liquid slags to a value 0.1 to 0.5 below a target basicity value ($CaO/SiO_2$) selected for target slag; and
   reducing metal oxides in said liquid slags to produce the target slag.

2. A method according to claim 1, wherein said at least one acidic substance is at least one of the group consisting of quartz sand, blast furnace slag, and $SiO_2$-containing substances.

3. A method according to claim 1, wherein, at or near the end of said reduction of metal oxides, said target basicity value for said target slag is a value of 1.1 to 1.5.

4. A method according to claim 2, wherein, at or near the end of said reduction of metal oxides, said target basicity value for said target slag is a value of 1.1 to 1.5.

5. A method according to claim 1, wherein, $Al_2O_3$-containing substances are added to said liquid slags, and wherein at least a part of said $Al_2O_3$-containing substances is added prior to said reduction of metal oxides.

6. A method according to claim 2, wherein, $Al_2O_3$-containing substances are added to said liquid slags, and wherein at least a part of said $Al_2O_3$-containing substances is added prior to said reduction of metal oxides.

7. A method according to claim 3, wherein, $Al_2O_3$-containing substances are added to said liquid slags, and wherein at least a part of said $Al_2O_3$-containing substances is added prior to said reduction of metal oxides.

8. A method according to claim 4, wherein, $Al_2O_3$-containing substances are added to said liquid slags, and wherein at least a part of said $Al_2O_3$-containing substances is added prior to said reduction of metal oxides.

9. A method according to claim 5, wherein said $Al_2O_3$-containing substance is bauxite.

10. A method according to claim 1, wherein said target basicity value for said target slag is adjusted by adding at least one of the group consisting of burnt lime and CaO-containing substances.

11. A method according to claim 2, wherein said target basicity value for said target slag is adjusted by adding at least one of the group consisting of burnt lime and CaO-containing substances.

12. A method according to claim 3, wherein said target basicity value for said target slag is adjusted by adding at least one of the group consisting of burnt lime and CaO-containing substances.

13. A method according to claim 4, wherein said target basicity value for said target slag is adjusted by adding at least one of the group consisting of burnt lime and CaO-containing substances.

14. A method according to claim 5, wherein said target basicity value for said target slag is adjusted by adding at least one of the group consisting of burnt lime CaO-containing substances.

15. A method according to claim 1, wherein said target basicity value is approached at the point in time at which the metal oxide content of the liquid slag falls below 3.5 percent by weight.

16. A method according to claim 2, wherein said target basicity value is approached at the point in time at which the metal oxide content of the liquid slag falls below 3.5 percent by weight.

17. A method according to claim 3, wherein said target basicity value is approached at the point in time at which the metal oxide content of the liquid slag falls below 3.5 percent by weight.

18. A method according to claim 4, wherein said target basicity value is approached at the point in time at which the metal oxide content of the liquid slag falls below 3.5 percent by weight.

19. A method according to claim 5, wherein the $Al_2O_3$-containing substances are added in an amount aimed to obtain an $Al_2O_3$-content of 12 to 15 percent by weight, whereby basicity is lowered by a slighter extent than at lower $Al_2O_3$ contents.

20. A method according to claim 6, wherein the $Al_2O_3$-containing substances are added in an amount aimed to obtain an $Al_2O_3$-content of 12 to 15 percent by weight, whereby basicity is lowered by a slighter extent than at lower $Al_2O_3$ contents.

* * * * *